United States Patent [19]
Becker

[11] 3,984,734
[45] Oct. 5, 1976

[54] PROTECTIVE CIRCUIT ARRANGEMENT FOR A HIGH-VOLTAGE CAPACITOR BANK

[75] Inventor: Michael Becker, Uttenreuth, Germany

[73] Assignee: Siemens Aktiengesellschaft, Munich, Germany

[22] Filed: Oct. 16, 1975

[21] Appl. No.: 623,113

[30] Foreign Application Priority Data
Oct. 29, 1974 Germany............................ 2451353

[52] U.S. Cl. ............................... 317/12 B; 317/49; 317/53; 317/27 R; 307/105
[51] Int. Cl.² ......................................... H02H 7/16
[58] Field of Search ............. 317/12 B, 12 R, 12 A, 317/49, 50, 53, 27 R, 147; 307/105; 324/77 E, 78 D, 78 F, 79 R, 79 D; 328/133, 139, 140

[56] References Cited
UNITED STATES PATENTS

| | | | |
|---|---|---|---|
| 3,319,120 | 5/1967 | Fahlen | 317/12 R |
| 3,486,073 | 12/1969 | Eriksson et al. | 317/53 X |
| 3,515,943 | 6/1970 | Warrington | 317/53 X |
| 3,735,250 | 5/1973 | Masui | 317/27 R X |
| 3,909,672 | 9/1975 | Lundquist et al. | 317/12 B |

*Primary Examiner*—J D Miller
*Assistant Examiner*—Patrick R. Salce
*Attorney, Agent, or Firm*—Kenyon & Kenyon Reilly Carr & Chapin

[57] ABSTRACT

A protective circuit for a high-voltage capacitor bank in which the capacitor bank is subdivided into two equal parallel branches with a current measuring device connected in series with each branch and the outputs of the two current measuring devices connected to a differential protection relay.

1 Claim, 2 Drawing Figures

3,984,734

PROTECTIVE CIRCUIT ARRANGEMENT FOR A HIGH-VOLTAGE CAPACITOR BANK

BACKGROUND OF THE INVENTION

This invention relates to capacitor banks in general, and more particularly, to an improved protective circuit arrangement for a high-voltage capacitor bank.

Protective circuit arrangements in which a high voltage capacitor bank having at least two equal parallel branches connected to one phase of a power supply system, each branch containing several individual capacitors in series with each other and with a current measuring device and having a differential protection device followed by monitoring means coupled to the current measuring devices are known. In general, these systems rely on the fact that if a defect occurs in the capacitor bank an asymmetry between the two branches will occur. The differential protection device responds to the asymmetry to give an output indication so that the necessary action can then be taken. However, in a bank of high voltage capacitors, asymmetries can also occur during normal operation of the system. For example, such can occur because of individual capacitors being subjected to different ambient conditions. The prior art circuit arrangements are unable to distinguish between asymmetries caused by a failure and asymmetries simply resulting from normal operation. As a result, they respond to both and provide, in many cases, a false alarm.

In view of this difficulty with prior art systems, the need for an improved system which does have the capability of distinguishing between asymmetries related to the operation of the system and those caused by a failure or defect in one of the individual capacitors is evident.

SUMMARY OF THE INVENTION

The present invention provides such a system. As with the prior art device, the capacitor bank is divided into two equal branches, each containing a number of capacitors with a current measuring device in series with each branch. The outputs of these current measuring devices are connected to a differential protective relay arrangement which includes logic means for differentiating between operation-related asymmetries and asymmetries simply resulting from normal operation.

DETAILED DESCRIPTION OF THE PREFERRED EMBODIMENT

Figure 1:
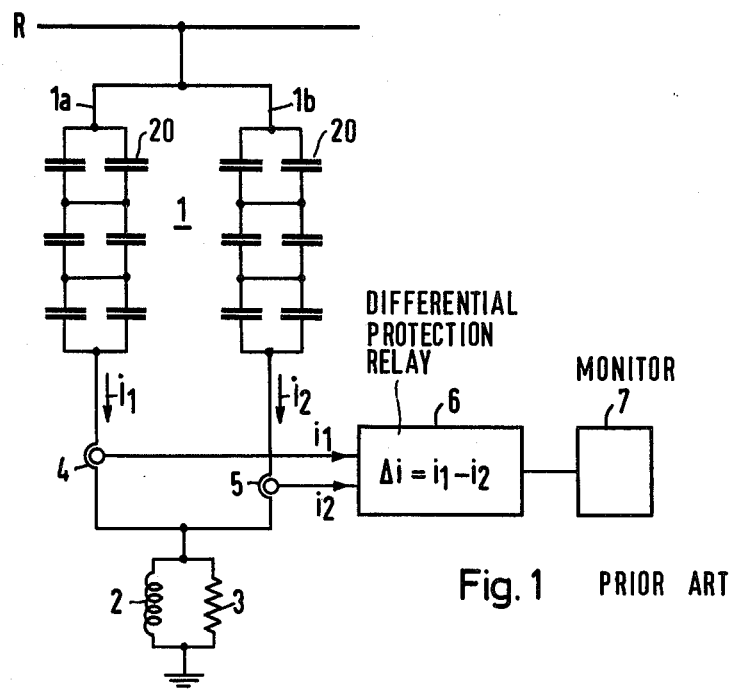
FIG. 1 is a block diagram of a prior art protective circuit arrangement.

As illustrated in FIG. 1, the prior art arrangement includes a capacitor bank 1 having branches 1a and 1b each containing a plurality of individual capacitors 20. The bank 1 is coupled to the phase R of a three phase network. Similar capacitor banks will normally be provided for the other two phases S and T. In series with the capacitors 20 and each of the branches 1a and 1b is a current measuring device such as a current transformer coupled in series therewith and capable of measuring respective currents flowing in each branch. These currents are designated as $i_1$ and $i_2$. The two branches 1a and 1b in parallel are coupled together at the other side of the current measuring devices 4 and 5 through the parallel combination of an inductor 2 and a resistor 3 to ground. The capacitor bank 1, the inductance 2 and the resistance 3 from a filter which through proper selection of components will respond in the desired manner to certain frequencies.

The outputs of the current measuring devices or current transformers 4 and 5 are provided as inputs to a differential protection relay 6, the output of which is provided to a monitoring device 7.

Figure 2:
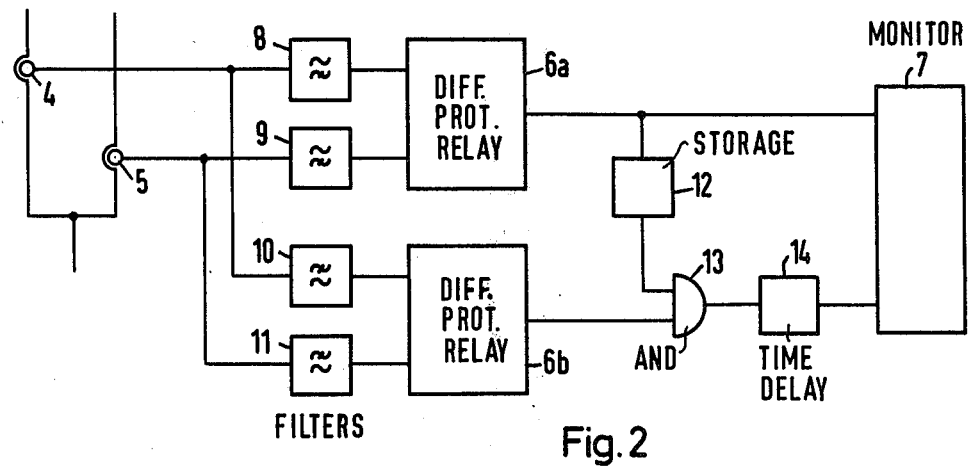
FIG. 2 is a block-logic diagram illustrating in detail the manner in which the present system is capable of distinguishing between an asymmetry caused by normal operation and one resulting from a failure.

FIG. 2 illustrates the circuit arrangement of the present invention. The arrangement of the capacitor bank and current transformers 4 and 5 will be as shown in FIG. 1. Similarly, a monitor 7 such as that of FIG. 1 is shown. However, between the monitor 7 and the current transformers 4 and 5, the circuit arrangement of the present invention is used to replace the differential protection relay. The illustrated arrangement includes first and second differential protection relays designated 6a and 6b. Each of the relays is coupled to both current transformers 4 and 5 through suitable filters designated 8 to 11. The differential protection relay 6a is connected to the current transformers 4 and 5 through high pass filters 8 and 9. The second differential protection relays 6b is coupled to the current transformers 4 and 5 through low pass filters 10 and 11. The output of the differential protection relay 6a is connected directly to the monitoring device 7 and also provides an input to a storage means 12, e.g. a flip-flop, which provides its output as a first input to an AND gate 13. The output of the second differential protection relay 6b is the second input to the AND gate 13. The AND gate 13 is coupled through a time delay means 14 as a second input to the montioring device 7.

If a transient occurs on the line, the high frequency equalization current associated with the beginning of the transient are coupled to the first differential protection relay 6a through the high pass filters 8 and 9. However, the high frequency equalization currents will not reach the second differential protection relay 6b because of the low pass filters 10 and 11. The second differential protection relay 6b will only experience at its input low frequency equalization currents occurring during the transition of an equalization transient to the steady state condition or the low frequency equalization currents which occur in the case of an operational related asymmetry. Thus, through a logical combination of the output signals of the two differential protection relays 6a and 6b an unequivcal distinction can be made between a defect and an operationally related condition. A defect is characterized by the occurrence of both high and low frequency equalization currents. Since the high and low frequency equalization currents occur sequentially in time, the storage means 12, e.g. a flip-flop is connected between the output of the first differential protection 6a and the one input of the AND gate 13. Since the time between the sequential events can be determined, it is more convenient to use as the storage means 12, rather than a flip-flop a monostable multivibrator outputting a pulse of sufficient duration such that it is still present at the AND gate when the second differential protection relay 6a is activated. In conventional fashion, there will be other protective devices associated with the capacitor bank. For this reason, the time delay means which can be at a time delay line or a monostable arrangement is provided with a delay set which is longer than the delay of the other protective devices normally associated with the individual capacitor elements. In this manner, these devices are given time to react prior to a fault signal being provided into the monitor 7.

In conventional fashion, the monitor 7 may simply be a visual or audio alarm or may be designed to initiate the disconnection of the capacitor bank. These and other modifications may be made without departing from the spirit of the invention which is intended to be limited solely by the appended claims.

What is claimed is:

1. In a protective circuit arrangement for a high voltage capacitor bank, including at least two equal branches containing individual capacitors connected in parallel and on one side to a phase of the network system, a current measuring device being arranged in series with each of the branches for measuring the current therein, with the outputs of the current measuring devices provided to a differential protection device, the output of which is coupled to a monitor, an improved differential protection device comprising:

a. a first differential protection relay having first and second inputs and an output;
b. first and second highpass filters coupling the first and second inputs of said first differential protection relay to the current measuring devices in the two branches;
c. a second differential protection relay having first and second inputs and an output;
d. first and second lowpass filters coupling the first and second inputs of said second differential protection relay to said two current measuring devices;
e. storage means coupled to the output of said first differential protection relay;
f. an AND gate having as inputs the output of said storage means and the output of said second differential protection relay;
g. time delay means having its input coupled to the output of said AND gate and providing an output which is delayed to appear a predetermined time after its input appears; and
h. wherein the output of said first differential protective relay and the output of said time delay means are coupled to the monitor.

* * * * *